United States Patent
An et al.

(10) Patent No.: US 12,408,123 B2
(45) Date of Patent: Sep. 2, 2025

(54) POWER ADJUSTMENT METHOD, STORAGE MEDIUM, AND TERMINAL

(71) Applicant: JRD COMMUNICATION (SHENZHEN) LTD., Guangdong (CN)

(72) Inventors: Xinrong An, Guangdong (CN); Xinni Yang, Guangdong (CN)

(73) Assignee: JRD COMMUNICATION (SHENZHEN) LTD., Guangdong (CN)

(*) Notice: Subject to any disclaimer, the term of this patent is extended or adjusted under 35 U.S.C. 154(b) by 413 days.

(21) Appl. No.: 18/040,628

(22) PCT Filed: Nov. 13, 2020

(86) PCT No.: PCT/CN2020/128823
§ 371 (c)(1),
(2) Date: Feb. 3, 2023

(87) PCT Pub. No.: WO2022/027859
PCT Pub. Date: Feb. 10, 2022

(65) Prior Publication Data
US 2023/0292260 A1 Sep. 14, 2023

(30) Foreign Application Priority Data
Aug. 6, 2020 (CN) .......................... 202010784200.6

(51) Int. Cl.
*H04W 52/36* (2009.01)
*H04W 52/28* (2009.01)

(52) U.S. Cl.
CPC ....... *H04W 52/367* (2013.01); *H04W 52/285* (2013.01)

(58) Field of Classification Search
CPC ............. H04W 52/367; H04W 52/285; H04W 52/228; H04W 52/282; H04W 52/0245; Y02D 30/70
See application file for complete search history.

(56) References Cited

U.S. PATENT DOCUMENTS 8,738,093 B1   5/2014 Gopalakrishnan et al.
8,886,247 B1  11/2014 Price et al.
(Continued)

FOREIGN PATENT DOCUMENTS

CN      1930897 A   3/2007
CN    106452490 A   2/2017
(Continued)

OTHER PUBLICATIONS

International Search Report in International application No. PCT/CN2020/128823, mailed on May 7, 2021.
(Continued)

*Primary Examiner* — Christine Ng
(74) *Attorney, Agent, or Firm* — PV IP PC; Wei Te Chung

(57) ABSTRACT

Disclosed in embodiments of the present application is a power adjustment method, comprising: determining variation values of a plurality of sample movement parameters during operation of a terminal; if a maximum variation value among the variation values of the plurality of sample movement parameters is greater than a preset threshold, obtaining a foreground application running currently; determining from a preset power set a target power value corresponding to the foreground application; and adjusting a current signal transmission power of the terminal based on the target power value.

20 Claims, 3 Drawing Sheets

(56) References Cited

U.S. PATENT DOCUMENTS

| | | | |
|---|---|---|---|
| 10,123,298 B1* | 11/2018 | De Lorenzo | G01S 5/0263 |
| 2006/0232466 A1* | 10/2006 | Park | G01S 19/48 |
| | | | 342/357.4 |
| 2010/0029321 A1 | 2/2010 | Miyamoto | |
| 2015/0214770 A1* | 7/2015 | Chen | H02J 7/0025 |
| | | | 320/135 |
| 2015/0347184 A1* | 12/2015 | Kim | G06F 9/5088 |
| | | | 718/104 |
| 2017/0192478 A1 | 7/2017 | Mercer et al. | |
| 2018/0335856 A1 | 11/2018 | Wolters | |
| 2020/0019830 A1* | 1/2020 | d'Armancourt | G06K 19/0723 |
| 2021/0232201 A1* | 7/2021 | Chen | G06F 9/547 |
| 2022/0232489 A1* | 7/2022 | Zhang | H04W 52/365 |

FOREIGN PATENT DOCUMENTS

| | | |
|---|---|---|
| CN | 109600409 A | 4/2019 |
| CN | 110138402 A | 8/2019 |
| CN | 110519835 A | 11/2019 |
| CN | 110908779 A | 3/2020 |
| CN | 111356222 A | 6/2020 |
| EP | 3531722 A1 | 8/2019 |

OTHER PUBLICATIONS

Written Opinion of the International Search Authority in International application No. PCT/CN2020/128823, mailed on May 7, 2021.

Notification to Grant Patent Right for Invention issued in corresponding Chinese Patent Application No. 202010784200.6 dated Feb. 16, 2022, pp. 1-4.

1st Chinese Office Action issued in corresponding Chinese Patent Application No. 202010784200.6 dated Apr. 26, 2021, pp. 1-5.

2nd Chinese Office Action issued in corresponding Chinese Patent Application No. 202010784200.6 dated Oct. 22, 2021, pp. 1-8.

European Search Report in European application No. 20947963.3, mailed on Jul. 22, 2024.

* cited by examiner

POWER ADJUSTMENT METHOD, STORAGE MEDIUM, AND TERMINAL

CROSS REFERENCE TO RELATED APPLICATIONS

The disclosure is a US national phase application based upon an International Application No. PCT/CN2020/128823, filed on Nov. 13, 2020, titled "POWER ADJUSTMENT METHOD, STORAGE MEDIUM, AND TERMINAL", which claims priority to CN patent application No. 202010784200.6 filed on Aug. 6, 2020, which is incorporated by reference in the present application in its entirety.

BACKGROUND OF DISCLOSURE

1. Field of Disclosure

The present disclosure relates to the field of application of mobile terminals, and more particularly, to a power adjustment method, device, storage medium and terminal.

2. Description of Related Art

With the development of terminal technology, for example, antenna design with metal frame is becoming more and more popular, multiple transmitting antennas are distributed in various positions around a mobile phone, and simultaneous transmission of multiple communication systems, such as WIFI®, 2/3/4G, and 5G, so that the specific absorption rate (SAR, also known as electromagnetic wave absorption ratio or specific absorption rate) value of the terminal increases. In particular, the SAR value indicates how much the heat energy of the mobile terminal will affect the human body. The larger the value, the greater the impact on the human body; otherwise, the less impact.

In related technologies, a SAR sensor (a capacitive proximity sensor) is installed inside the terminal to detect user usage scenarios, and dynamically adjust terminal conduction power according to different user usage scenarios to reduce the SAR value.

Technical Problem

Embodiments of the present application provide a power adjustment method, device, storage medium, and terminal, which can solve the problem of low efficiency of terminal conduction power adjustment when power adjustment is performed to control the SAR value during operation of a terminal.

SUMMARY

In the first aspect, the embodiment of the present application provides a power adjustment method, including:
  determining movement change information during operation of a terminal, wherein the movement change information includes variation values of a plurality of sample movement parameters;
  obtaining a currently running foreground application when a maximum variation value among the variation values of the plurality of sample movement parameters is greater than a preset threshold;
  determining a target power value corresponding to the foreground application from a preset power set, wherein the preset power set includes a plurality of sample power values in which each sample power value corresponds to a different application; and adjusting a current signal transmission power of the terminal based on the target power value.

In a second aspect, an embodiment of the present application provides a storage medium, wherein the storage medium stores a plurality of instructions, and the instructions are suitable for being loaded by a processor to execute the above-mentioned power adjustment method.

In a third aspect, an embodiment of the present application provides a terminal, including a processor and a memory, where a plurality of instructions are stored in the memory, and the processor loads the instructions to execute the power adjustment method as described above.

Useful Effect:

In this embodiment of the present application, a acceleration sensor is used to detect the change of acceleration value of a terminal in different directions. When the change of the acceleration value exceeds the preset variation value, a current running application is determined, and a current signal transmission power of the terminal is adjusted according to a power value corresponding to the running application. Thus, the efficiency of the terminal in adjusting the signal transmission power can be improved.

BRIEF DESCRIPTION OF DRAWINGS

In order to more clearly illustrate the technical solutions in the embodiments of the present application, the drawings that need to be used in the description of the embodiments will be briefly introduced below. Obviously, the drawings in the following description are only some embodiments of the present application. For those skilled in the art, other drawings can also be obtained based on these drawings without any creative effort.

DETAILED DESCRIPTION OF EMBODIMENTS

The following will clearly and completely describe technical solutions in embodiments of the present application with reference to the accompanying drawings in the embodiments of the present application. Obviously, the described embodiments are only part of the embodiments of the present application, not all of them. Based on the embodiments in this application, all other embodiments obtained by those skilled in the art without making creative efforts belong to the scope of protection of this application.

In view of the above problems, embodiments of the present application provide a power adjustment method, device, storage medium, and terminal, which can improve the efficiency of the terminal in adjusting signal transmission power. Each will be described in detail below. It should be noted that the order in which the following embodiments are described is not intended to limit an order of preference of the embodiments.

Figure 1:
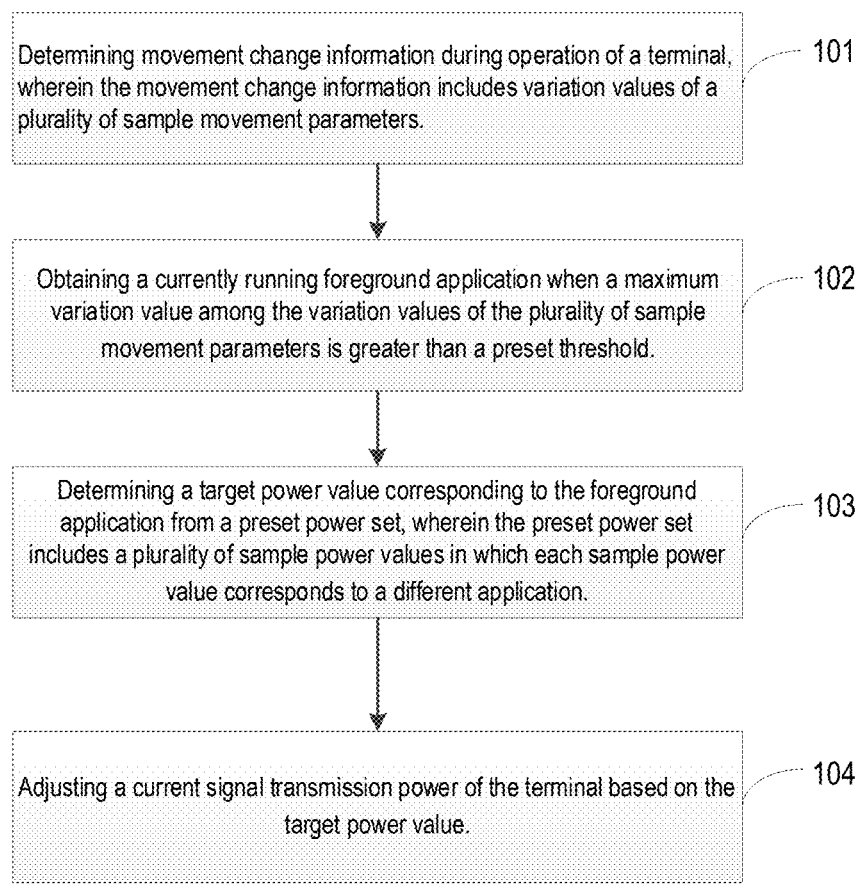
FIG. 1 is a schematic flowchart of a power adjustment method provided by an embodiment of the present application.

Please refer to FIG. 1. FIG. 1 is a schematic flowchart of a power adjustment method provided by an embodiment of the present application. The power adjustment method can be applied to mobile terminals such as mobile phones, tablet computers, notebook computers, palmtop computers, and portable media players (PMP), as well as fixed terminals such as desktop computers. The specific process of the power adjustment method can be as follows:

101: Determining movement change information during operation of a terminal, wherein the movement change information includes variation values of a plurality of sample movement parameters.

In this embodiment, the terminal can be equipped with a G-sensor (acceleration sensor), which can sense changes in acceleration force. The acceleration force is the force that acts on an object during an acceleration process. Various movement changes, such as shaking, falling, rising, or descent can be converted into electrical signals by the G-sensor, and then through calculation and analysis of a microprocessor, be used to complete programmed functions.

An accelerometer is a sensor capable of measuring acceleration. It usually consists of mass block, damper, elastic element, sensitive element and adjustment circuit. During a acceleration process, the sensor uses Newton's second law to obtain acceleration values by measuring inertial forces on the mass block. Further, by measuring the acceleration caused by gravity, an inclination angle of the device relative to a horizontal plane can be calculated. By analyzing dynamic acceleration, the way the device moves can be analyzed.

In particular, the acceleration sensor can obtain the deflection angle of the current terminal on each coordinate axis in the three-dimensional space, and calculate the gravitational acceleration of the terminal on the coordinate axis according to the deflection angle of the terminal on each coordinate axis, and further determine the movement of a current movement state of the terminal. The three-dimensional space may include an X coordinate axis, a Y coordinate axis, and a Z coordinate axis.

In an embodiment, the the plurality of sample movement parameters include at least a first movement parameter, a second movement parameter and a third movement parameter, for example, the first movement parameter may be an acceleration of gravity on the X axis, and the second movement parameter may be an acceleration of gravity of the Y axis, the third movement parameter may be an acceleration of gravity of the Z axis. Then the step of determining the movement information during operation of the terminal may include:

(1) obtaining current movement information at a current moment, where the current movement information includes a first parameter value of the first movement parameter, a first parameter value of the second movement parameter, and a first parameter value of the third movement parameter;

(2) obtaining a previous historical movement information, wherein the previous historical movement information includes a second parameter value of the first movement parameter, a second parameter value of the second movement parameter, and a second parameter value of the third movement parameter, the previous historical movement information is movement information obtained at a previous historical moment with a preset time interval difference from the current moment; and (3) determining a variation value of each of the movement parameters based on the first parameter value and the second parameter value of each of the movement parameters.

In particular, the current movement information may be the parameter value of each sample movement parameter obtained by the acceleration sensor at the current moment, as the first parameter value of each sample movement parameter. For example, the sample movement parameter may include the first movement parameter, the second movement parameter, and the third movement parameter. The first parameter value of the first movement parameter may be 0, the first value of the second movement parameter may be 9.8, and the first parameter value of the third movement parameter may be 0.

After the current movement information of the terminal is obtained, the previous historical movement information of the terminal can be obtained. The terminal may obtain terminal movement information at each preset time interval, and determine the movement change of the terminal at the preset time interval based on two adjacent pieces of movement information. Wherein, the previous historical movement information may be movement information acquired by the acceleration sensor at a previous historical moment located before the current moment according to a preset time interval. The previous historical movement information includes the second parameter value of each of the movement parameters. For example, the second parameter value of the first movement parameter can be 0, the second parameter value of the second movement parameter can be 9.5, and the second parameter value of the third movement parameter can be 0.3.

After determining the first parameter value and the second parameter value of each movement parameter, through calculation performed according to the first parameter value and the second parameter value of each movement parameter, the difference between the first parameter value and the second parameter value can be determined and obtained as the variation value for each movement parameter.

For example, the first parameter value of the first movement parameter can be 0, and the second parameter value of the first movement parameter can be 0; the first parameter value of the second movement parameter can be 9.8, and the second parameter value of the second movement parameter can be is 9.5; the first parameter value of the third movement parameter can be 0, the second movement parameter value of the third movement parameter can be 0.3. By calculating the first parameter value and the second parameter value of each movement parameter, the variation value of the first movement parameter being 0, the variation value of the second movement parameter being 0.3, and the variation value of the third movement parameter being 0.3 are obtained.

102: obtaining a currently running foreground application when a maximum variation value among the variation values of the plurality of sample movement parameters is greater than a preset threshold.

After the variation value of each sample parameter is determined, a maximum variation value may be determined from a plurality of variation values, and the maximum variation value is compared with a preset threshold. Wherein, by setting a preset threshold, the movement state of the terminal can be determined more accurately, so as to determine whether the terminal is far away from a user.

In an embodiment, user usage scenarios may include: holding a phone call in hand and close to the head, browsing a mobile phone in hand, placing the mobile phone on the user's body, and the user tries to keep still, placing the mobile phone on a table, taking the mobile phone away from the human body, but placing it on a moving object, such as a car, etc. By detecting the variation value of the movement parameter in each user usage scenario, the minimum variation value may be detected as 0.5 in the above user usage scenarios: holding a phone call in hand and close to the head, browsing a mobile phone in hand, placing the mobile phone on the user's body, and the user tries to keep still, placing the mobile phone on a table, taking the mobile phone away from the human body, but placing it on a moving object, such as a car, etc.

Wherein, according to measurements and tests of the gravitational acceleration change in each user scenario, the preset threshold can be set to 0.2, but it is not used to limit the preset threshold, and can also be set to other values according to the actual situation.

When detecting that there is a variation value greater than the preset threshold among the variation values of the sample movement parameters, the current terminal can be determined as being in used by the user. In the situation, the terminal is close to the human body, and a power reduction mechanism can be turned on. The power reduction mechanism can perform power adjustment according to the application currently running on the terminal.

For example, the variation value of the first movement parameter can be 0, the variation value of the second movement parameter can be 0.3, the variation value of the third movement parameter can be 0.3, the preset threshold can be 0.2. The variation values of the movement parameters can be compared with the preset threshold, and it can be determined that there is a variation value greater than the preset threshold.

In one embodiment, the foreground application currently running on the terminal can be obtained. The running foreground application can be an application currently being operated by the user, that is, the application currently displayed on a display of the terminal. For example, the terminal detects that the currently running foreground application can be application A, and may adjust the signal transmission power of the terminal based on application A.

Wherein, the transmission power of the terminal is stipulated in the Global System for Mobile Communication (GSM) protocol, and the transmission power of the terminal can be controlled by the base station (through the downlink channel SACCH). The minimum power emitted by a GSM terminal is 5 dBm (decibel milliwatts) (GSM900), which is about 3.2 mW (milliwatts); the maximum power is 33 dBm (GSM900), which is about 2 W. In the case of blocking or being far away from the base station, the terminal transmits more power to ensure communication quality. On the other hand, on the premise of ensuring communication quality, the smaller the terminal transmission power, the better.

103: determining a target power value corresponding to the foreground application from a preset power set, wherein the preset power set includes a plurality of sample power values in which each sample power value corresponds to a different application.

Wherein, the preset power set may include the plurality of sample power values and the plurality of sample applications, and each sample power value corresponds to one sample application. Sample applications can be applications that communicate with the base station, such as call applications, various network applications, etc. When running these applications, the terminal needs to communicate with the base station, and it is necessary to ensure the strength of the terminal's transmission power. At the same time, considering the impact of transmission power on the human body, the transmission power needs to be adjusted accordingly.

For example, the preset power set may include the first sample application, the second sample application, the third sample application, etc., the first sample application corresponds to the first power value, the second sample application corresponds to the second power value, and the third sample application corresponds to the second power value. Apply corresponds to the third power value.

Before determining the target power value corresponding to the foreground application from the preset power set, matching the foreground application with one sample application in the preset power set can be performed. When the foreground application is a sample application in the preset power set, then the power value corresponding to the foreground application may be obtained from a preset power set as the target power value.

Some embodiments, before the step of determining the target power value corresponding to the foreground application from the preset power set, may further include:
    obtaining application priority information when detecting that a number of running foreground applications exceeds a preset number; and
    determining a foreground application with a highest priority among all the foreground applications as a target foreground application based on the priority information;
    wherein the determining the target power value corresponding to the foreground application from the preset power set includes: determining a power corresponding to the target foreground application in the preset power set as the target power value.

In one embodiment, the terminal can support split-screen operation, that is, at least two applications can be simultaneously executed on the current display screen. When a plurality of foreground applications are running on the terminal, the terminal needs to determine the target foreground application from the plurality of foreground applications, and obtains a power value corresponding to the target foreground application to adjust the signal transmission power of the terminal.

Wherein, when it is detected that the number of foreground applications of the terminal exceeds the preset number, the preset number may be 2, and the application priority information may be obtained. The application priority information may include running priorities of all applications in the terminal. For example, the terminal may include application B and application C, obtain application priority information, and determine that the priority of application B is higher than the priority of application C. Then, when the terminal runs application B and application C at the same time, the terminal will prioritize tasks of the application B.

Wherein, according to the application priority information, an application with the highest application priority can be obtained from the the plurality of foreground applications as the target foreground application. After the target foreground application is determined, a step may be performed to obtain the power value corresponding to the target foreground application from the preset power set as the target power value.

Some embodiments may further include:
  acquiring the current signal transmission power when the maximum variation value among the variation values of the plurality of sample movement parameters is smaller than the preset threshold;
  comparing the current signal transmission power with a preset transmission power for comparison;
  adjusting the current signal transmission power to the preset transmission power if the current signal transmission power is greater than the preset transmission power.

Wherein, if the variation values of the plurality of sample movement parameters are less than a preset threshold, it may be determined that the current terminal is in a static state, which may include scenarios of being far away from the user. At this time, the transmission power of the terminal will not affect the user. Then the current signal transmission power can be acquired, and the current signal transmission power can be compared with the preset transmission power. Wherein, the preset transmission power may be a transmission power for normal communication between the terminal and the base station.

When the current signal transmission power of the terminal is greater than the preset transmission power, the current signal transmission power can be adjusted to the preset transmission power, which can save power consumption of the terminal.

Some embodiments, after the step of obtaining the current signal transmission power, may further include:
  acquiring an running application;
  performing the step of adjusting the current signal transmission power to the preset transmission power if the running application is an application in a preset application set.

Wherein, the running application may include a foreground application or a background application currently running on the terminal. The preset application set can be the applications in the preset power set in the above steps. The running of the application in the preset application set requires the terminal to communicate with the base station and needs a strong signal transmission power, so the current signal transmission power can be adjusted to the preset transmission power to ensure normal operation of the terminal.

104: adjusting a current signal transmission power of the terminal based on the target power value.

After the target power value is determined, a current power value of the current signal transmission power can be obtained. The current power value can be adjusted to the target power value, and the current power can be reduced to reduce the impact of SAR value on human body.

For example, the current power value may be 15 dbm, and the target power value may be 10 dbm, then the current power value of the current signal transmission power may be adjusted to 10 dbm.

In some embodiments, in obtaining the movement information, the time interval may be determined according to the signal transmission power of the terminal, the movement information may be obtained based on the time interval, and the method may further include:
  acquiring the movement information of the terminal every preset first time interval when detecting that the signal transmission power of the terminal is in a first power value interval; and
  acquiring the movement information of the terminal every preset second time interval when detecting that the signal transmission power of the terminal is in a second power value interval.

Wherein, the first power value interval may be a power value range during normal operation of the terminal. For example, the first power value interval may include power values 20-25. The first time interval corresponding to the first power value interval may be set to a relatively short time, such as 200 milliseconds (ms).

Wherein, the second power value interval may be a power value interval after signal transmission power of the terminal is reduced. For example, the second power value interval may include power values 5-10. The second time interval corresponding to the second power value interval may be set to a relatively long time, for example, may be 30 s (second).

In an embodiment, when the terminal is in a static state, that is, when the variation value of the movement parameters of the terminal is less than a preset threshold, the signal transmission power of the terminal may be set to a normal power, and the normal power may be set according to actual conditions. When the signal transmission power of the terminal is the normal power, the SAR value may be relatively large, so a detection frequency may be set to 200 ms, that is, the first time interval. Alternatively, when the terminal is in a moving state, that is, the variation value of the terminal's movement parameters is greater than the preset threshold, and the SAR value is relatively small, the detection frequency can be set to 30 s without affecting the operation of the terminal. Extending the detection frequency can save terminal power consumption.

The embodiment of the present application discloses a power adjustment method. The power adjustment method includes: determining movement change information during operation of a terminal, wherein the movement change information includes variation values of a plurality of sample movement parameters; obtaining a currently running foreground application when a maximum variation value among the variation values of the plurality of sample movement parameters is greater than a preset threshold; determining a target power value corresponding to the foreground application from a preset power set, wherein the preset power set includes a plurality of sample power values in which each sample power value corresponds to a different application; and adjusting a current signal transmission power of the terminal based on the target power value. In this embodiment of the present application, the acceleration sensor is used to detect the change of the acceleration value of the terminal in different directions. When the change of the acceleration value exceeds the preset variation value, the current running application is determined, and the signal transmission power of the current terminal is adjusted according to the power value corresponding to the running application. Thus, the efficiency of the terminal in adjusting the signal transmission power can be improved.

Figure 2:
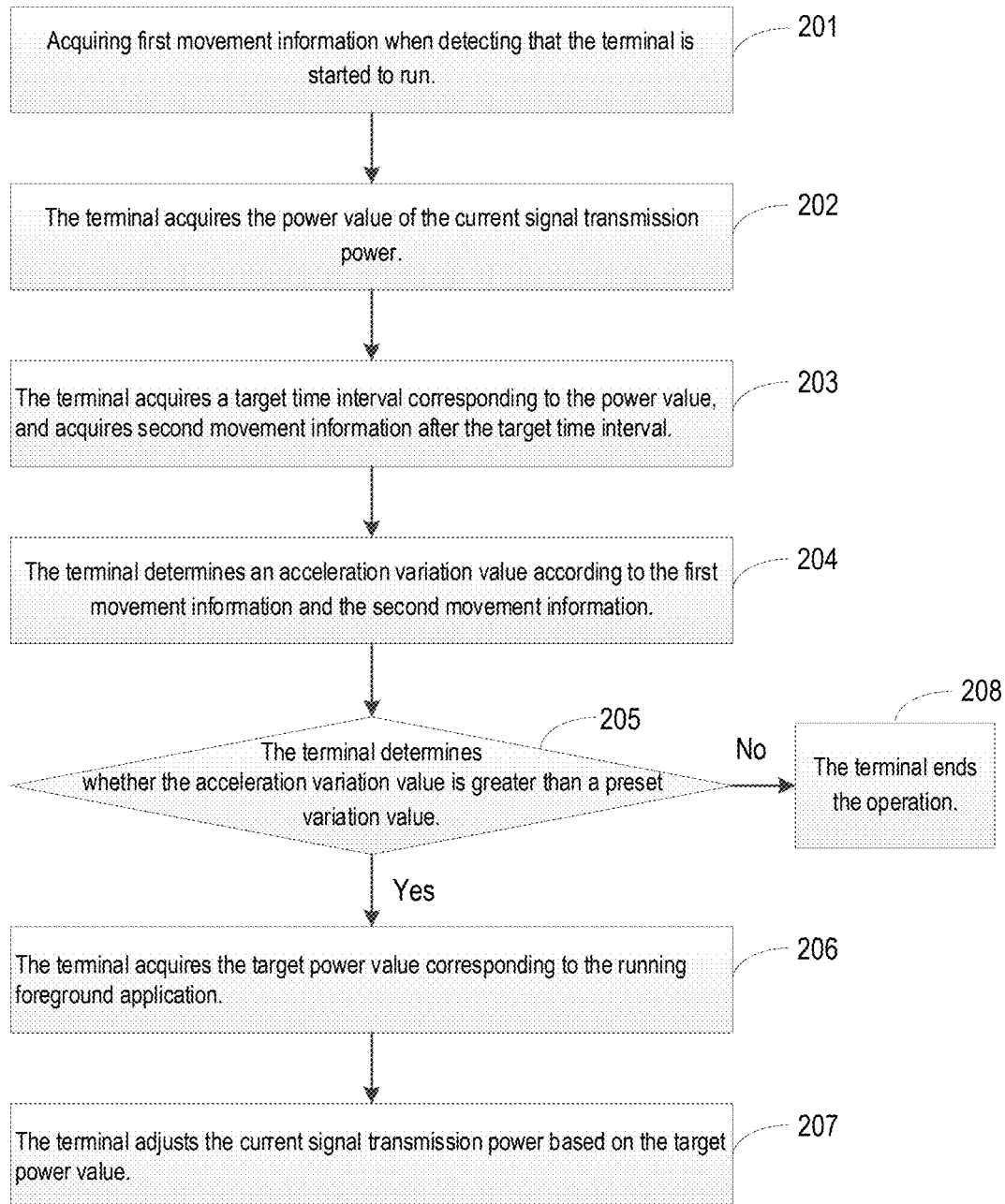
FIG. 2 is a schematic flowchart of another power adjustment method provided by an embodiment of the present application.

Please refer to FIG. 2. FIG. 2 is a schematic flowchart of another power adjustment method provided by an embodiment of the present application. The specific scenario and application of the power adjustment method may be as follows:

201: Acquiring first movement information when detecting that the terminal is started to run.

In this embodiment, detecting that the terminal is started to run may be to perform a power-on operation according to a user instruction. After the power-on operation is completed, it may be determined that the terminal is started to run, and is in a running state.

When the terminal is running, first movement information may be acquired, and the first movement information may include a movement acceleration value of a coordinate axis of the terminal in a three-dimensional space. Wherein, the three-dimensional space may include an X axis, a Y axis, and a Z axis. The first movement information may include movement acceleration values corresponding to the terminal on the X-axis, Y-axis, and Z-axis respectively current.

For example, in the first movement information, the movement acceleration of the X axis may be 5.3, the movement acceleration of the Y axis may be 2.3, and the movement acceleration of the Z axis may be 2.2.

202: The terminal acquires the power value of the current signal transmission power.

After acquiring the first movement information, the terminal may acquire the power value of the current signal transmission power. The terminal may determine the detection frequency according to the power value of the current signal transmission power, and the detection frequency may be a working frequency of the acceleration sensor.

For example, the power value obtained by the terminal may be 20 for the current signal transmission power.

203: The terminal acquires a target time interval corresponding to the power value, and acquires second movement information after the target time interval.

Wherein, the terminal may judge whether the power value is within a preset power value interval according to the power value of the current transmission power. The preset power value interval may include a first power value interval and a second power value interval. The first power value interval may correspond to the first time interval, and the second power value interval may correspond to the second time interval.

For example, the current power value can be 20, the first power value interval can include power values 20~25, and the first time interval corresponding to the first power value interval can be 200 milliseconds (ms). The second power value interval can include power values 5~10, and the second time interval corresponding to the second power value interval may be 30 s. Then, it can be determined that the current power value is in the first power value interval. Then, the first time interval corresponding to the first power value interval may be used as the target time interval.

After the target time interval is determined, the movement information of the terminal can be acquired every target time interval. Wherein, the second moment of acquisition of the second movement information is different from the first moment of acquisition of the first movement information by a target time interval. The second movement information may further include movement acceleration values corresponding to the X-axis, Y-axis, and Z-axis of the terminal at the second moment.

For example, in the second movement information, the movement acceleration of the X axis may be 5.8, the movement acceleration of the Y axis may be 2.0, and the movement acceleration of the Z axis may be 2.0.

204: The terminal determines an acceleration variation value according to the first movement information and the second movement information.

Specifically, in the first movement information, the movement acceleration of the X axis may be 5.3, the movement acceleration of the Y axis may be 2.3, and the movement acceleration of the Z axis may be 2.2. In the second movement information, the movement acceleration of the X axis may be 5.8, the movement acceleration of the Y axis can be 2.0, and the movement acceleration of the Z axis can be 2.0. The acceleration variation value of each coordinate axis can be determined according to the first movement information and the second movement information, the acceleration variation value of the X axis is 0.3, the acceleration variation value of the Y axis is 0.3, and the acceleration variation value of the Z axis is 0.2.

205: The terminal determines whether the acceleration variation value is greater than a preset variation value.

After the acceleration variation value of each coordinate axis is determined, a plurality of acceleration variation values may be compared with the preset variation value.

For example, the acceleration variation value of the X axis can be 0.3, the acceleration variation value of the Y axis can be 0.3, the acceleration variation value of the Z axis can be 0.2, and the preset variation value can be 0.2. Then, it can be determined that the acceleration variation value of the X axis and the acceleration variation value of the Y axis is greater than the preset variation value, and step 206 may be executed.

For another example, the acceleration variation value of the X axis can be 0.1, the acceleration variation value of the Y axis can be 0.1, the acceleration variation value of the Z axis can be 0.1, and the preset variation value can be 0.2. Then, it can be determined that the acceleration variation values are less than the preset variation value, and step 208 can be executed.

206: The terminal acquires the target power value corresponding to the running foreground application.

When detecting that the acceleration variation value of the terminal is greater than the preset variation value, it may be determined that the current terminal is in a movement state. Further, the terminal can obtain the running foreground application, determine whether the foreground application is an application in the preset application set, and the terminal can set corresponding power values for the applications in the preset application set in advance.

If the foreground application is an application in the preset application set, the power value corresponding to the foreground application may be acquired as the target power value.

For example, the obtained foreground application may be application A, and the preset application set may include application A, application B, application C, and so on. It can be determined that the foreground application is an application in the preset application set, and then the power value of the application A can be acquired, which can be 15.

207: The terminal adjusts the current signal transmission power based on the target power value.

After the target power corresponding to the foreground application is determined, the power value of the signal transmission power of the terminal can be set as the target power to complete the power reduction operation in the movement state of the terminal.

208: The terminal ends the operation.

When detecting that the acceleration variation value of the terminal is less than the preset variation value, it may be determined that the current terminal is in a static state. At this point, the terminal can continue to run the application at the current transmission power.

The embodiment of the present application discloses a power adjustment method. The power adjustment method includes: determining movement change information during operation of a terminal, wherein the movement change information includes variation values of a plurality of sample movement parameters; obtaining a currently running foreground application when a maximum variation value among the variation values of the plurality of sample movement parameters is greater than a preset threshold; determining a target power value corresponding to the foreground application from a preset power set, wherein the preset power set includes a plurality of sample power values in which each sample power value corresponds to a different application; and adjusting a current signal transmission power of the terminal based on the target power value. In this embodiment of the present application, the acceleration sensor is used to detect the change of the acceleration value of the terminal in different directions. When the change of the acceleration value exceeds the preset variation value, the current running application is determined, and the signal transmission power of the current terminal is adjusted according to the power value corresponding to the running application. Thus, the efficiency of the terminal in adjusting the signal transmission power can be improved.

In order to better implement the power adjustment method provided by the embodiment of the present application, the embodiment of the present application further provides a device based on the above power adjustment method. The meanings of the terms are the same as those in the above power adjustment method, and for specific implementation details, refer to the description in the method embodiments.

Figure 3:
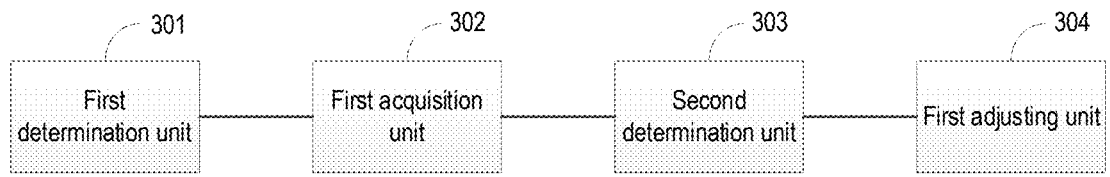
FIG. 3 is a structural block diagram of a power adjustment device provided by an embodiment of the present application.

Please refer to FIG. 3. FIG. 3 is a structural block diagram of a power adjustment device provided by an embodiment of the present application. The power adjustment device can be applied to mobile terminals, such as mobile phones, tablet computers, notebook computers, palmtop computers, portable media players (PMP) and other mobile terminals, and fixed terminals such as desktop computers. The device includes:
   a first determination unit 301 configured to determine movement change information during operation of a terminal, wherein the movement change information includes variation values of a plurality of sample movement parameters
   a first acquisition unit 302 configured to obtain a currently running foreground application when a maximum variation value among the variation values of the plurality of sample movement parameters is greater than a preset threshold;
   a second determination unit 303 configured to determine a target power value corresponding to the foreground application from a preset power set, wherein the preset power set includes a plurality of sample power values in which each sample power value corresponds to a different application; and
   a first adjusting unit 304 configured to adjust a current signal transmission power of the terminal based on the target power value.

Figure 4:
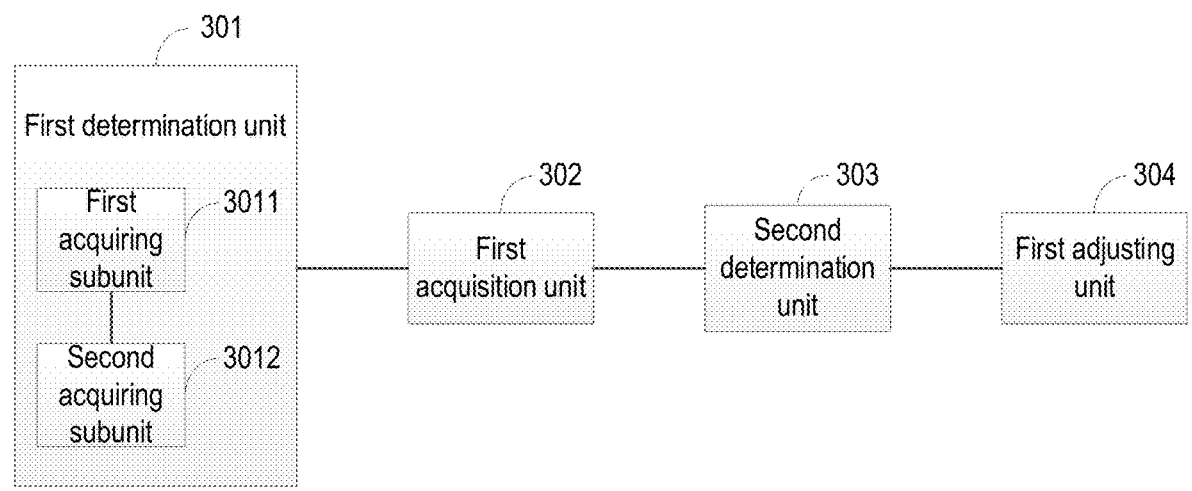
FIG. 4 is a structural block diagram of another power adjustment device provided by an embodiment of the present application.

In some embodiments, please refer to FIG. 4. FIG. 4 is a structural block diagram of another power adjustment device provided in an embodiment of the present application. The first determination unit 301 may include:
   a first acquiring subunit 3011 configured to obtain current movement information at a current moment, where the current movement information includes a first parameter value of the first movement parameter, a first parameter value of the second movement parameter, and a first parameter value of the third movement parameter;
   a second acquiring subunit 3012 configured to obtain a previous historical movement information, wherein the previous historical movement information includes a second parameter value of the first movement parameter, a second parameter value of the second movement parameter, and a second parameter value of the third movement parameter, the previous historical movement information is movement information obtained at a previous historical moment with a preset time interval difference from the current moment.

In some embodiments, the power adjustment device may further include:
   a detection unit configured to obtain application priority information when detecting that a number of running foreground applications exceeds a preset number; and
   a third determination unit is configured to determine a foreground application with a highest priority among all the foreground applications as a target foreground application based on the priority information.

In some embodiments, the power adjustment device may further include:
   a second acquisition unit configured to acquire the current signal transmission power when the maximum variation value among the variation values of the plurality of sample movement parameters is smaller than the preset threshold;
   a comparing unit configured to compare the current signal transmission power with a preset transmission power for comparison;
   a second adjusting unit configured to adjust the current signal transmission power to the preset transmission power if the current signal transmission power is greater than the preset transmission power.

In some embodiments, the power adjustment device may further include:
   a third acquiring unit configured to acquire an running application;
   an executing unit configured to perform the step of adjusting the current signal transmission power to the preset transmission power if the running application is an application in a preset application set.

In some embodiments, the power adjustment device may further include:
   a fourth acquisition unit is configured to acquire the movement information of the terminal every preset first time interval when detecting that the signal transmission power of the terminal is in a first power value interval; and
   a fifth obtaining unit is configured to acquire the movement information of the terminal every preset second time interval when detecting that the signal transmission power of the terminal is in a second power value interval.
   a determination subunit is configured to determine a variation value of each of the movement parameters based on the first parameter value and the second parameter value of each of the movement parameters.

The embodiment of the present application discloses a power adjustment device, the power adjustment device includes: determining movement change information during operation of a terminal, wherein the movement change information includes variation values of a plurality of sample movement parameters; obtaining a currently running foreground application when a maximum variation value among the variation values of the plurality of sample movement parameters is greater than a preset threshold; determining a target power value corresponding to the foreground application from a preset power set, wherein the preset power set includes a plurality of sample power values in which each sample power value corresponds to a different application; and adjusting a current signal transmission power of the terminal based on the target power value. In this embodiment of the present application, the acceleration sensor is used to detect the change of the acceleration value of the terminal in different directions. When the change of the acceleration value exceeds the preset variation value, the current running application is determined, and the signal transmission power of the current terminal is adjusted according to the power value corresponding to the running application. Thus, the efficiency of the terminal in adjusting the signal transmission power can be improved.

Figure 5:
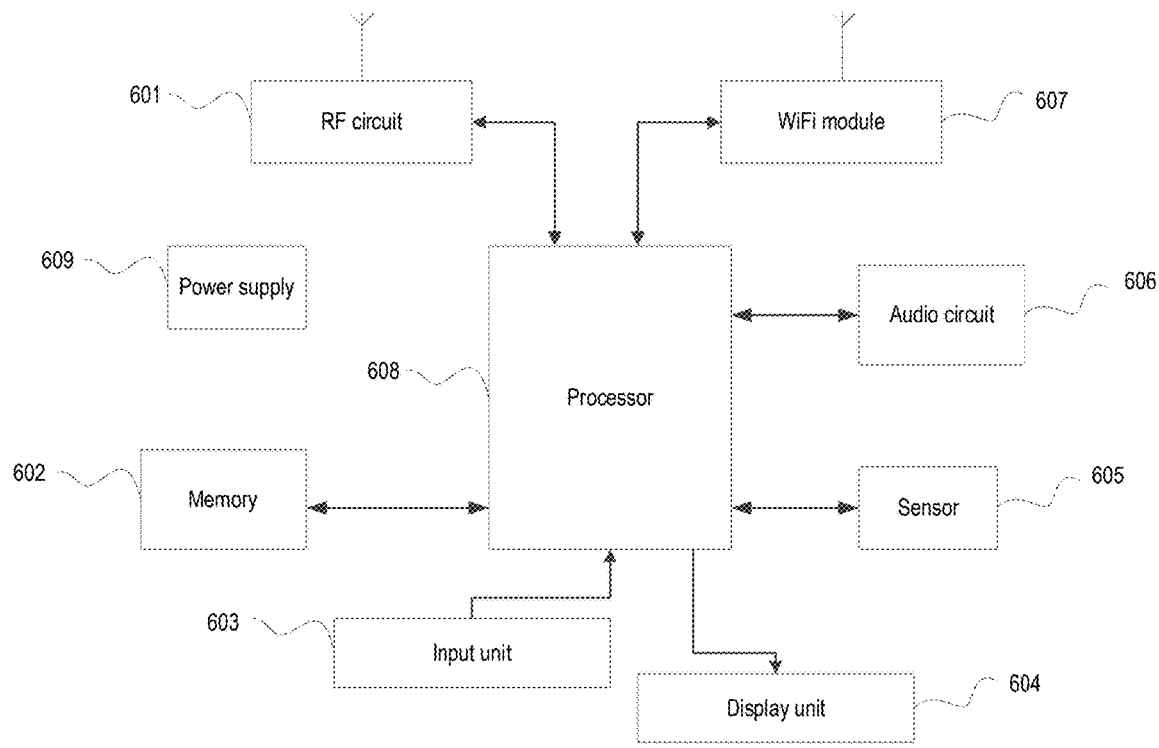
FIG. 5 is a schematic structural diagram of a terminal provided by an embodiment of the present application.

The embodiment of the present application also provides a terminal. As shown in FIG. 5, the terminal may include a radio frequency (RF) circuit 601, a memory 602 including one or more storage media, an input unit 603, a display unit 604, a sensor 605, an audio circuit 606, a Wireless Fidelity (WIFI®) module 607, a processor 608 including one or more processing cores, a power supply 609 and other components. Those skilled in the art can understand that the terminal structure shown in FIG. 5 does not constitute a limitation on the terminal, and may include more or less components than those shown in the figure, or combine some components, or arrange different components. Wherein:

The RF circuit 601 can be used for receiving and sending signals in the process of sending and receiving information. In particular, after receiving downlink information from the base station, the RF circuit 601 redirects the downlink information for processing by one or more processors 608, and additionally, sends uplink data is to the base station. Generally, the RF circuit 601 includes but is not limited to an antenna, at least one amplifier, a tuner, one or more oscillators, a subscriber identity module (SIM) card, a transceiver, a coupler, a low noise amplifier (LNA), duplexer, etc. In addition, the RF circuit 601 can also communicate with networks and other devices through wireless communication.

The memory 602 can be used to store software programs and modules, and the processor 608 executes various functional applications and power adjustment by running the software programs and modules stored in the memory 602. The memory 602 may mainly include a program storage area and a data storage area, wherein the program storage area may store an operating system, at least one application required for a function (such as a sound playback function, an image playback function, etc.) and the like. In addition, the memory 602 may include a high-speed random access memory, and may further include a non-volatile memory, such as at least one magnetic disk storage device, flash memory device, or other volatile solid-state storage devices. Correspondingly, the memory 602 may further include a memory controller to provide access to the memory 602 by the processor 608 and the input unit 603.

The input unit 603 can be used to receive input numbers or character information, and generate signal input of keyboard, mouse, joystick, optical or trackball related to user settings and function control. Specifically, in a specific embodiment, the input unit 603 may include a touch-sensitive surface as well as other input devices. A touch-sensitive surface, also known as a touch display or trackpad, collects the user's touch on or in proximity of the surface (for example, the user uses a finger, stylus, any suitable object, or accessory to operate on the touch-sensitive surface or near the touch-sensitive surface), and drive a corresponding connected device according to a preset driver program. In addition to touch-sensitive surfaces, the input unit 603 may further include other input devices. Specifically, other input devices may include, but are not limited to, one or more of physical keyboards, function keys (such as volume control keys, switch keys, etc.), trackballs, mice, joysticks, and the like.

The display unit 604 can be used to display information input by the user or provided to the user and various graphical user interfaces of a server. These graphical user interfaces can be composed of graphics, text, icons, videos and any combination thereof. The display unit 604 may include a display panel. Optionally, the display panel may be configured in the form of a liquid crystal display (LCD), an organic light-emitting diode (OLED), and the like. Further, the touch-sensitive surface may cover the display panel, and when the touch-sensitive surface detects a touch operation on or near it, it is sent to the processor 608 to determine a type of the touch event, and then the processor 608 displays corresponding visual output on the panel according to the type of the touch event. Although in FIG. 5, the touch-sensitive surface and the display panel are used as two independent components to realize the input and input functions, in some embodiments, the touch-sensitive surface and the display panel can be integrated to realize the input and output functions.

The terminal may further include at least one sensor 605, such as a light sensor, a motion sensor, and other sensors. Specifically, the light sensor can include an ambient light sensor and a proximity sensor, wherein the ambient light sensor can adjust the brightness of the display panel according to brightness of the ambient light, and the proximity sensor can turn off the display panel and the backlight when the server moves to the ear.

Audio circuit 606, speakers, and microphones may provide an audio interface between the user and the server. The audio circuit 606 can transmit the electrical signal converted from the received audio data to the speaker, and the speaker converts it into an audio signal for output. On the other hand, the microphone converts the collected audio signal into an electrical signal, which is converted by the audio circuit 606 into audio data. After being processed by the audio data output processor 608, the audio data is sent to, for example, a terminal through the RF circuit 601, or the audio data is output to the memory 602 for further processing. Audio circuitry 606 may further include an earbud jack to provide peripheral headset communication with the server.

WIFI® is a short-distance wireless transmission technology. The terminal can help users send and receive emails, browse web pages, and access streaming media through the WiFi module 607, which provides users with wireless broadband Internet access. Although FIG. 5 shows the WiFi module 607, it can be understood that it is not an essential component of the terminal, and can be completely omitted as required without changing the essence of the application.

The processor 608 is the control center of the terminal. It uses various interfaces and lines to connect various parts of the entire mobile phone. By running or executing software programs and modules stored in the memory 602, and calling data stored in the memory 602, the server executes various functions and processing data, so as to monitor the mobile phone as a whole. Optionally, the processor 608 may include one or more processing cores. Preferably, the processor 608 may integrate an application processor and a modem processor, wherein the application processor mainly processes operating systems, user interfaces, and application programs, etc. The modem processor mainly processes wireless communications. It can be understood that the foregoing modem processor may not be integrated into the processor 608.

The terminal further includes a power supply 609 (such as a battery) for supplying power to various components. Preferably, the power supply can be logically connected to the processor 608 through the power management system, so that functions such as charging, discharging, and power consumption management can be implemented through the power management system. The power supply 609 may further include one or more DC or AC power supplies, recharging systems, power failure detection circuits, power converters or inverters, power status indicators and other arbitrary components.

Specifically, in this embodiment, the processor 608 in the terminal loads the executable file corresponding to process (es) of one or more application programs into the memory 602 according to the following instructions, and the processor 608 runs the executable file stored in the memory 602, so as to realize various functions:

determining movement change information during operation of a terminal, wherein the movement change information includes variation values of a plurality of sample movement parameters;

obtaining a currently running foreground application when a maximum variation value among the variation values of the plurality of sample movement parameters is greater than a preset threshold;

determining a target power value corresponding to the foreground application from a preset power set, wherein the preset power set includes a plurality of sample power values in which each sample power value corresponds to a different application; and adjusting a current signal transmission power of the terminal based on the target power value.

The embodiment of the present application discloses a power adjustment method, device, storage medium and terminal. The power adjustment method includes: determining movement change information during operation of a terminal, wherein the movement change information includes variation values of a plurality of sample movement parameters; obtaining a currently running foreground application when a maximum variation value among the variation values of the plurality of sample movement parameters is greater than a preset threshold; determining a target power value corresponding to the foreground application from a preset power set, wherein the preset power set includes a plurality of sample power values in which each sample power value corresponds to a different application; and adjusting a current signal transmission power of the terminal based on the target power value. In this embodiment of the present application, the acceleration sensor is used to detect the change of the acceleration value of the terminal in different directions. When the change of the acceleration value exceeds the preset variation value, the current running application is determined, and the signal transmission power of the current terminal is adjusted according to the power value corresponding to the running application. Thus, the efficiency of the terminal in adjusting the signal transmission power can be improved.

Those of ordinary skill in the art can understand that all or part of the steps in the various methods of the above-mentioned embodiments can be completed by instructions, or by instructions controlling related hardware. The instructions can be stored in a storage medium and loaded and executed by a processor.

To this end, an embodiment of the present application provides a storage medium, in which a plurality of instructions are stored, and the instructions can be loaded by a processor to execute the steps in any power adjustment method provided in the embodiments of the present application. For example, the command can perform the following steps:

determining movement change information during operation of a terminal, wherein the movement change information includes variation values of a plurality of sample movement parameters; obtaining a currently running foreground application when a maximum variation value among the variation values of the plurality of sample movement parameters is greater than a preset threshold; determining a target power value corresponding to the foreground application from a preset power set, wherein the preset power set includes a plurality of sample power values in which each sample power value corresponds to a different application; and adjusting a current signal transmission power of the terminal based on the target power value.

For the specific implementation of the above operations, reference may be made to the foregoing embodiments, and details are not repeated here.

Wherein, the storage medium may include: a read only memory (ROM), a random access memory (RAM), a magnetic disk or an optical disk, and the like.

Due to the instructions stored in the storage medium, the steps in any power adjustment method provided by the embodiments of the present application can be executed, and therefore, the beneficial effects that can be achieved by any power adjustment method provided by the embodiments of the present application can be realized. For the beneficial effects, please refer to the previous embodiments for details, and details will not be repeated here.

The power adjustment method, device, storage medium and terminal provided by the embodiment of the present application are described above in detail. In this description, specific examples are used to illustrate the principle and implementation of the present application. The description of the above embodiment is only for facilitating understand the method of this application and its core idea. Additionally, for those skilled in the art, according to the idea of this application, there will be changes in the specific implementation and scope of application. In summary, the content of this specification should not understood as a limitation of the application.

What is claimed is:

1. A power adjustment method comprising:
    determining movement change information during operation of a terminal, wherein the movement change information includes variation values of a plurality of sample movement parameters;
    obtaining a currently running foreground application when a maximum variation value among the variation values of the plurality of sample movement parameters is greater than a preset threshold;
    determining a target power value corresponding to the foreground application from a preset power set, wherein the preset power set includes a plurality of sample power values in which each sample power value corresponds to a different application; and
    adjusting a current signal transmission power of the terminal based on the target power value.

2. The method according to claim 1, wherein the plurality of sample movement parameters at least include a first movement parameter, a second movement parameter and a third movement parameter;
    said determining movement information during operation of the terminal comprises:
        obtaining current movement information at a current moment, where the current movement information includes a first parameter value of the first movement parameter, a first parameter value of the second movement parameter, and a first parameter value of the third movement parameter;
obtaining a previous historical movement information, wherein the previous historical movement information includes a second parameter value of the first movement parameter, a second parameter value of the second movement parameter, and a second parameter value of the third movement parameter, the previous historical movement information is movement information obtained at a previous historical moment with a preset time interval difference from the current moment; and
determining a variation value of each of the movement parameters based on the first parameter value and the second parameter value of each of the movement parameters.

3. The method according to claim 1, wherein before determining the target power value corresponding to the foreground application from the preset power set, further comprising:
obtaining application priority information when detecting that a number of running foreground applications exceeds a preset number; and
determining a foreground application with a highest priority among all the foreground applications as a target foreground application based on the priority information;
wherein the determining the target power value corresponding to the foreground application from the preset power set includes: determining a power corresponding to the target foreground application in the preset power set as the target power value.

4. The method according to claim 1, further comprising:
acquiring the current signal transmission power when the maximum variation value among the variation values of the plurality of sample movement parameters is smaller than the preset threshold;
comparing the current signal transmission power with a preset transmission power for comparison;
adjusting the current signal transmission power to the preset transmission power if the current signal transmission power is greater than the preset transmission power.

5. The method according to claim 4, wherein, after acquiring the current signal transmission power, further comprising: acquiring an running application;
performing the step of adjusting the current signal transmission power to the preset transmission power if the running application is an application in a preset application set.

6. The method according to claim 1, further comprising:
acquiring the movement information of the terminal every preset first time interval when detecting that the signal transmission power of the terminal is in a first power value interval; and
acquiring the movement information of the terminal every preset second time interval when detecting that the signal transmission power of the terminal is in a second power value interval.

7. The method according to claim 1, wherein, before determining the target power value corresponding to the foreground application from the preset power set, further comprising:
acquiring a plurality of sample applications in the preset power set;
matching the foreground application with the plurality of sample applications;
performing the step of determining the target power value corresponding to the foreground application from the preset power set if the matching is successful.

8. A storage medium, wherein the storage medium stores a plurality of instructions, and the instructions are suitable for being loaded by a processor to perform the following steps:
determining movement change information during operation of a terminal, wherein the movement change information includes variation values of a plurality of sample movement parameters;
obtaining a currently running foreground application when a maximum variation value among the variation values of the plurality of sample movement parameters is greater than a preset threshold;
determining a target power value corresponding to the foreground application from a preset power set, wherein the preset power set includes a plurality of sample power values in which each sample power value corresponds to a different application; and
adjusting a current signal transmission power of the terminal based on the target power value.

9. The storage medium according to claim 8, wherein the plurality of sample movement parameters at least include a first movement parameter, a second movement parameter and a third movement parameter;
said determining movement information during operation of the terminal comprises:
obtaining current movement information at a current moment, where the current movement information includes a first parameter value of the first movement parameter, a first parameter value of the second movement parameter, and a first parameter value of the third movement parameter;
obtaining a previous historical movement information, wherein the previous historical movement information includes a second parameter value of the first movement parameter, a second parameter value of the second movement parameter, and a second parameter value of the third movement parameter, the previous historical movement information is movement information obtained at a previous historical moment with a preset time interval difference from the current moment; and
determining a variation value of each of the movement parameters based on the first parameter value and the second parameter value of each of the movement parameters.

10. The storage medium according to claim 8, wherein before determining the target power value corresponding to the foreground application from the preset power set, further comprising:
obtaining application priority information when detecting that a number of running foreground applications exceeds a preset number; and
determining a foreground application with a highest priority among all the foreground applications as a target foreground application based on the priority information;
wherein the determining the target power value corresponding to the foreground application from the preset power set includes: determining a power corresponding to the target foreground application in the preset power set as the target power value.

11. The storage medium according to claim 8, wherein the instructions are suitable for being loaded by a processor, and further perform the following steps:
- acquiring the current signal transmission power when the maximum variation value among the variation values of the plurality of sample movement parameters is smaller than the preset threshold;
- comparing the current signal transmission power with a preset transmission power for comparison;
- adjusting the current signal transmission power to the preset transmission power if the current signal transmission power is greater than the preset transmission power.

12. The storage medium according to claim 11, wherein, after acquiring the current signal transmission power, further comprising: acquiring an running application;
- performing the step of adjusting the current signal transmission power to the preset transmission power if the running application is an application in a preset application set.

13. The storage medium according to claim 8, further comprising:
- acquiring the movement information of the terminal every preset first time interval when detecting that the signal transmission power of the terminal is in a first power value interval; and
- acquiring the movement information of the terminal every preset second time interval when detecting that the signal transmission power of the terminal is in a second power value interval.

14. The storage medium according to claim 8, wherein, before determining the target power value corresponding to the foreground application from the preset power set, further comprising:
- acquiring a plurality of sample applications in the preset power set;
- matching the foreground application with the plurality of sample applications;
- performing the step of determining the target power value corresponding to the foreground application from the preset power set if the matching is successful.

15. A terminal, including:
- a processor; and
- a memory;
- wherein the memory stores a plurality of instructions, and the processor loads the instructions to perform the following steps:
- determining movement change information during operation of a terminal, wherein the movement change information includes variation values of a plurality of sample movement parameters;
- obtaining a currently running foreground application when a maximum variation value among the variation values of the plurality of sample movement parameters is greater than a preset threshold;
- determining a target power value corresponding to the foreground application from a preset power set, wherein the preset power set includes a plurality of sample power values in which each sample power value corresponds to a different application; and
- adjusting a current signal transmission power of the terminal based on the target power value.

16. The terminal according to claim 15, wherein the plurality of sample movement parameters at least include a first movement parameter, a second movement parameter and a third movement parameter;
- said determining movement information during operation of the terminal comprises:
- obtaining current movement information at a current moment, where the current movement information includes a first parameter value of the first movement parameter, a first parameter value of the second movement parameter, and a first parameter value of the third movement parameter;
- obtaining a previous historical movement information, wherein the previous historical movement information includes a second parameter value of the first movement parameter, a second parameter value of the second movement parameter, and a second parameter value of the third movement parameter, the previous historical movement information is movement information obtained at a previous historical moment with a preset time interval difference from the current moment; and
- determining a variation value of each of the movement parameters based on the first parameter value and the second parameter value of each of the movement parameters.

17. The terminal according to claim 15, wherein before determining the target power value corresponding to the foreground application from the preset power set, further comprising:
- obtaining application priority information when detecting that a number of running foreground applications exceeds a preset number; and
- determining a foreground application with a highest priority among all the foreground applications as a target foreground application based on the priority information;
- wherein the determining the target power value corresponding to the foreground application from the preset power set includes: determining a power corresponding to the target foreground application in the preset power set as the target power value.

18. The terminal according to claim 15, wherein the processor loads the instruction and further performs the following steps:
- acquiring the current signal transmission power when the maximum variation value among the variation values of the plurality of sample movement parameters is smaller than the preset threshold;
- comparing the current signal transmission power with a preset transmission power for comparison;
- adjusting the current signal transmission power to the preset transmission power if the current signal transmission power is greater than the preset transmission power.

19. The terminal according to claim 18, wherein, after acquiring the current signal transmission power, further comprising: acquiring an running application;
- performing the step of adjusting the current signal transmission power to the preset transmission power if the running application is an application in a preset application set.

20. The terminal according to claim 15, further comprising:
- acquiring the movement information of the terminal every preset first time interval when detecting that the signal transmission power of the terminal is in a first power value interval; and acquiring the movement information of the terminal every preset second time interval when detecting that the signal transmission power of the terminal is in a second power value interval.

* * * * *